United States Patent [19]
Tng

[11] Patent Number: 6,065,104
[45] Date of Patent: May 16, 2000

[54] METHOD OF EMBEDDING PAGE ADDRESS TRANSLATION ENTRIES WITHIN A SEQUENTIALLY ACCESSED DIGITAL AUDIO DATA STREAM

[75] Inventor: Seng-Khoon Tng, Sunnyvale, Calif.

[73] Assignee: S3 Incorporated, Santa Clara, Calif.

[21] Appl. No.: 08/899,355

[22] Filed: Jul. 23, 1997

[51] Int. Cl.$^7$ ...................................................... G06F 12/00
[52] U.S. Cl. .................................. 711/209; 707/100; 710/6
[58] Field of Search ............................ 711/209; 707/100; 710/6, 24

[56] References Cited

U.S. PATENT DOCUMENTS 5,652,854   7/1997   Wong .................................... 711/209 X
5,893,162   4/1999   Lau et al. ............................. 707/100 X

OTHER PUBLICATIONS

Tenebaum et al., Data Structures Using Pascal, 1981, pp. 166–168.

*Primary Examiner*—David L. Robertson
*Attorney, Agent, or Firm*—Christie, Parker & Hale, LLP

[57] ABSTRACT

A data stream accessed in a sequential manner is stored in a plurality of pages in a main memory of a computer system. The pages are contiguous in virtual memory but not in physical memory. The page address translation entry needed to translate the virtual address of a next page into a physical address is embedded in the current page of the data stream. A peripheral processor coupled to the main memory by a bus accesses the data stream by reading the page address translation entry of the first page of the data stream, reading the page addressed by the physical address resulting from the page address translation entry, obtaining the next page address translation entry by extracting it from the current page without performing a read operation of the bus, and reading the next page addressed by the physical address resulting from the extracted page address translation entry.

14 Claims, 8 Drawing Sheets

METHOD OF EMBEDDING PAGE ADDRESS TRANSLATION ENTRIES WITHIN A SEQUENTIALLY ACCESSED DIGITAL AUDIO DATA STREAM

FIELD OF THE INVENTION

This invention relates generally to the use of virtual memory by a computer system employing an audio data processing subsystem and more specifically to a method of sequentially accessing physically non-contiguous pages of a digital audio data stream by an audio processing unit over a system bus using embedded page address translation entries.

BACKGROUND OF THE INVENTION

Many computer systems, including personal computers (PCs), employ virtual memory. Virtual memory is the simulation of a uniformly addressable computational memory large enough to accommodate all instantiations of a program on all configurations of a computer system. Virtual memory provides a uniform address format and addressing protocol that is independent of the sizes of the memory levels in the system and the number of processing elements. The set of addresses that a processor can generate as it executes a program is called the virtual address space of a program. The set of addresses recognized by a memory device of the computer system is called the memory space. A buffer of virtual memory could appear to be contiguous in the virtual memory space although the underlying physical memory in the memory space is non-contiguous (i.e., the blocks of physical memory allocated for the buffer is scattered randomly in the virtual memory space).

The mapping of processor-generated addresses in the virtual address space to memory-recognizable addresses in the memory space is typically carried out by a dynamic address translator (DAT) interposed between a processor and a memory system. The DAT makes address translation transparent to the programmer. Addressing invariance with respect to changes in the computer system's configuration or the distribution of data among memory elements is achieved by allowing the operating system of the computer system to change mapping tables during a program's execution. The system state is dynamically reflected in the mapping of the virtual address space to the memory space, rather than in the program itself.

The mapping from the virtual address space to the memory space is usually stored in a direct lookup mapping table for fast retrieval and update. Both the virtual address space and the memory space are divided into blocks. In a mapping scheme called paging, the blocks of the virtual address space are called pages, and the blocks of the memory space are called page frames. The mapping table specifies the page frame in which each page is stored. A virtual address generated by the processor is partitioned into the high-order bits which function as a page number and the low-order bits which function as a byte offset within the page. Address translation is the substitution of the page frame number for the page number.

A small associative memory called a translation lookaside buffer (TLB) is often included inside the translator mechanism in conjunction with a processor. The TLB holds the mapping table. Each TLB cell contains a page address translation entry of the mapping table which is accessed much faster than an entry stored in the main memory for the computer system. To perform an address translation, the translator interrogates the TLB. If an entry is not found in the TLB to assist in the translation, the translator must obtain the mapping from main memory. The new entry fetched from main memory typically replaces the least recently used entry in the TLB.

In some situations, a peripheral processor or device (such as an audio processing unit or graphics accelerator processor) must access main memory to obtain data necessary for peripheral processing. The peripheral processor may be passed a virtual address of the start of the data in main memory by the central processing unit (CPU) of the computer system. The peripheral processor performs the address translation function to obtain the address in the memory space where the data physically resides, and then fetches the data. If the page address translation entries are stored on the peripheral device, access time is minimized but the local memory required for the entries could be very large. If the page address translation entries are stored in main memory, additional memory is not needed on the peripheral device, but access time to the entries by the peripheral processor may become prohibitively slow.

Figure 1:
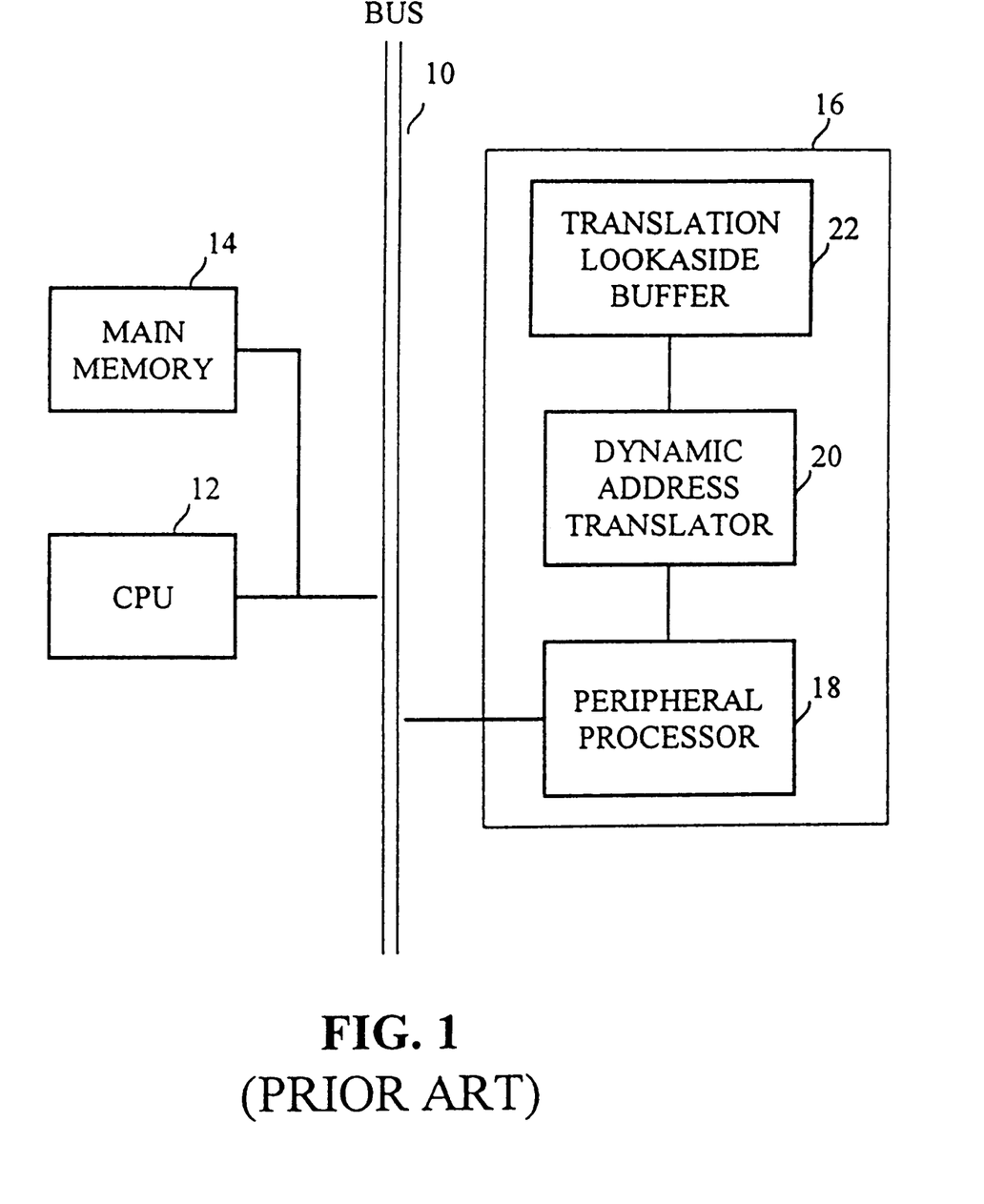
FIG. 1 is a diagram of a prior art peripheral processing unit coupled to a main memory by a bus.

FIG. 1 is a diagram of a prior art peripheral processing unit coupled to a main memory by a bus. On one side of a Bus 10 (such as a Peripheral Component Interconnect(PCI) Bus or a VL-Bus (VLB), a CPU 12 interacts with a Main Memory 14. On the other side of the Bus is a Peripheral Processing Unit 16 including a Peripheral Processor 18. The Peripheral Processor is generally coupled to one or more peripheral devices (not shown). The Peripheral Processor is an audio data processing subsystem commonly known as an audio accelerator, a display processing subsystem such as a graphics accelerator, or other subsystem providing predetermined capabilities. The Peripheral Processor uses a Dynamic Address Translator 20 to translate a virtual page address (in the virtual address space) into a real page address (in the memory space). The Translation Lookaside Buffer 22 holds the most recently used page address translation entries.

The storage needed on the Peripheral Processor for the page address translation entries in many cases is very large and expensive to implement. In some implementations, only selected page address translation entries are cached in the Translation Lookaside Buffer 22 and the majority of the page address translation entries are stored in Main Memory 14. Whenever the Dynamic Address Translator needs to translate a given page address that is not currently stored in the Translation Lookaside Buffer, the peripheral-side hardware (i.e., an audio or graphics accelerator) pauses the translation function, fetches the required entry from the Main Memory 14, and then continues with peripheral processing by completing the translation function and fetching the desired data from the Main Memory at the computed physical address. However, this activity requires an extra read operation over the Bus 10 to get the desired page address translation entry for each page of data. The time delay incurred by the Peripheral Processor 18 while waiting for the page address translation entry to be delivered can be substantial, thereby negatively affecting overall system performance. For peripheral processing units such as audio or graphics accelerators, this increased latency for page address translation entry access results in unacceptable performance for updating computer displays or outputting audio signals through a loudspeaker to a user.

SUMMARY OF THE INVENTION

One embodiment of the present invention operates on a digital audio data stream accessed in a sequential manner which is stored in a plurality of pages in a main memory of a computer system. The pages are contiguous in virtual memory but not in physical memory. The page address translation entry needed to translate the virtual address of a next page into a physical address is embedded in the current page of the digital audio data stream. A peripheral processor, such as an audio processing unit, coupled to the main memory by a bus accesses the digital audio data stream by reading the page address translation entry of the first page of the data stream, reading the page addressed by the physical address resulting from the page address translation entry, obtaining the next page address translation entry by extracting it from the current page without performing a read operation of the bus, and reading the next page addressed by the physical address resulting from the extracted page address translation entry.

Additional advantages and novel features of the invention will be set forth in part in the description which follows, and will become apparent to those skilled in the art upon examination of the following, or may be learned by practice of the invention.

The present invention provides a method of embedding page address translation entries within a sequentially accessed audio data buffer having the steps of storing the audio data buffer in at least a first page and a second page of memory which are contiguous in virtual memory but non-contiguous in physical memory, and storing a page address translation entry for a virtual address of the second page of memory in the first page of memory.

According to one embodiment of the present invention, the foregoing and other advantages are attained by a system for processing a digital audio sample data buffer stored in a main memory, the main memory coupled to a PCI bus, the digital audio sample data being stored in a plurality of pages of the main memory which are contiguous in virtual memory but non-contiguous in physical memory. The system includes an audio processing unit having a first-in, first-out (FIFO) buffer for temporarily storing the pages received from the main memory, and a digital signal processor for receiving a command to start playing a digital audio sample represented by the digital audio sample data buffer, for processing pages of the digital audio sample data buffer received from the FIFO buffer, for generating analog electrical signals corresponding to the processed pages, and for sending the signals to the loudspeaker. The audio processing unit reads a first page address translation entry for a first virtual address of a starting location of a first page of the digital audio sample data buffer from a location in the main memory. Also included in the audio processing unit is a page address translation block having means for translating the first virtual address into a first physical address using the first page address translation entry, means for extracting a second page address translation entry for a second virtual address of a starting location of a second page of the digital audio sample data buffer from within the first page, and means for translating the second virtual address into a second physical address using the second page address translation entry. The audio translation unit reads the first page of the digital audio sample data buffer addressed by the first physical address and stores the first page in the FIFO buffer, and reads the second page of the digital audio sample data buffer addressed by the second physical address and stores the second page in the FIFO buffer.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

Figure 2:
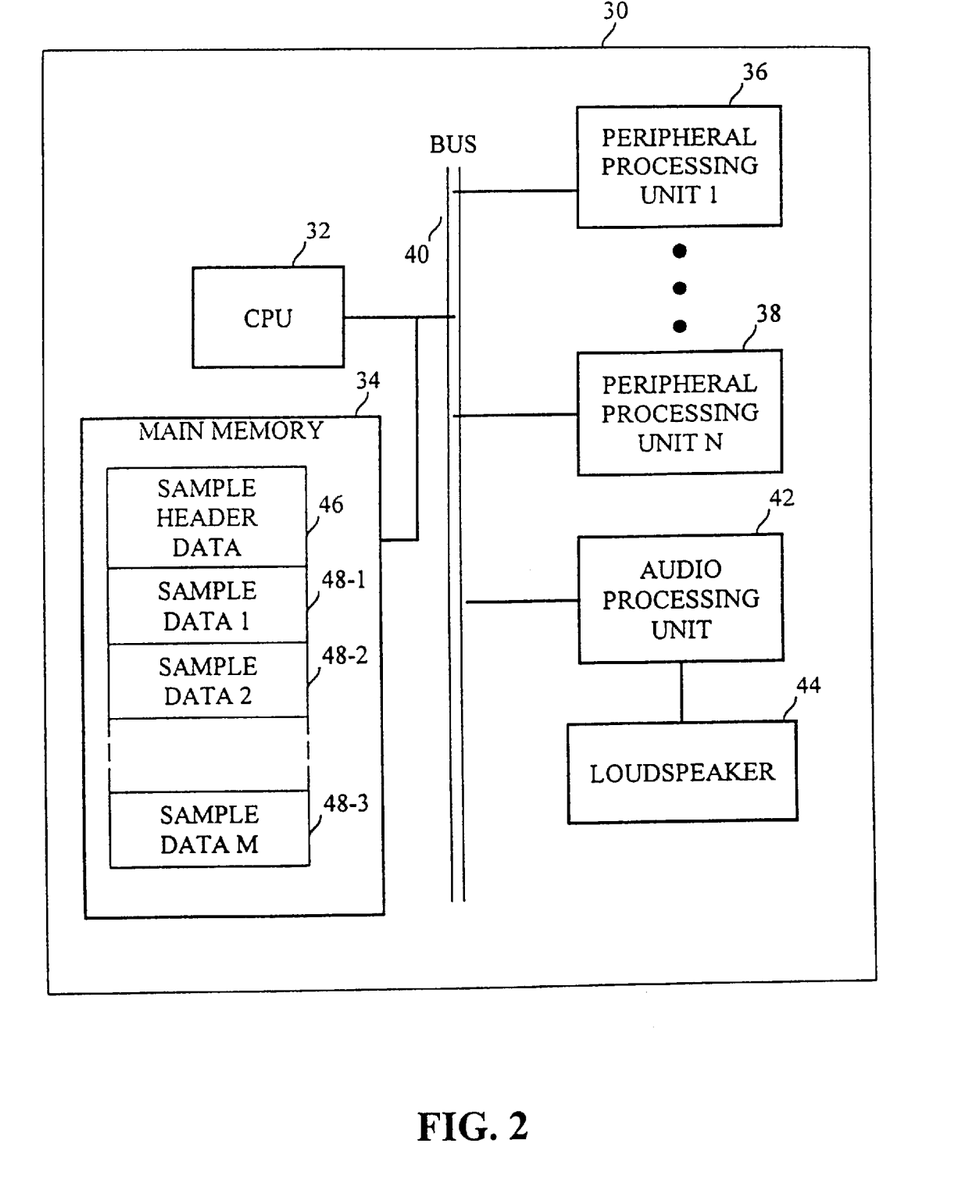
FIG. 2 is a system overview diagram of the present invention.

FIG. 2 is a system overview diagram of the present invention. A Computer System 30 includes standard components such as Central Processing Unit (CPU) 32 and Main Memory 34. The Computer System 30 may be an engineering workstation, mini-computer, or large scale computer system, but in the preferred embodiment it is a personal computer (PC). A plurality of peripheral devices (not shown) are supported by Peripheral Processing Unit 1 36 through Peripheral Processing Unit N 38. The peripheral devices are controlled by the CPU 32 according to commands and data sent over a Bus 40 to the peripheral processing units. In the preferred embodiment, the Bus 40 is a Peripheral Component Interconnect(PCI) Bus, although other buses (such as the VL-Bus (VLB)) could also be used. Another peripheral processing unit coupled to the Bus is Audio Processing Unit 42. Audio Processing Unit 42 is coupled to one or more Loudspeakers 44 to project sound to the user of the Computer System.

The Audio Processing Unit 42 processes data represented in standard digital audio file formats (e.g., .WAV files, and Musical Instrument Digital Interface (MIDI) files) to produce sounds in conjunction with computer system processing. Sounds are generated from digital audio sample data. The digital audio sample data is stored in Main Memory 34 of the Computer System. Each set of sample data is stored in a sample buffer in the Main Memory. The Main Memory stores a physically contiguous set of Sample Header Data 46 which includes control and identification information for each sample. The samples are stored in virtual memory as Sample Data 1 48-1, Sample Data 2 48-2, through Sample Data M 48-3. Although shown contiguous in virtual memory in FIG. 2, this data is stored in physically non-contiguous locations in Main Memory 34.

When a sound is required to be generated by the Loudspeaker 44 by a program being executed by the CPU, the CPU 32 sends a command over the Bus 40 to the Audio Processing Unit 42 to play a selected sample. Since the sample header data and sample data are stored in the Main Memory, the CPU sends a virtual address of the start of the selected sample header data in the command to the Audio Processing Unit. The Audio Processing Unit translates the virtual address into a physical address and initiates a read operation over the Bus 40 to get the sample header data for the selected sample. The sample header data includes the starting virtual address of the sample data. The sample header data is sent over Bus 40 to the Audio Processing Unit, which then translates the starting virtual address into a starting physical address and initiates a read operation over the Bus to fetch the first block of sample data from Main Memory. The sample data may comprise many blocks of data. One or more blocks of data are stored in a page of memory. When the first block of sample data arrives at the Audio Processing Unit from the Main Memory, the block is stored in a temporary First-In, First-Out (FIFO) buffer (not shown). The Audio Processing Unit then generates the sound represented by the block of sample data by converting the digital audio sample data to analog electrical signals sent to the Loudspeaker 44. Once the first block of the sample is processed, the next block must be identified, fetched, and converted, and so on, until all blocks of the sample have been processed in sequence.

The timing for the retrieval of the sample data from Main Memory is of critical importance because it directly effects the rate at which sounds can be generated by the Audio Processing Unit 42 and Loudspeaker 44. If the retrieval operation is too slow, sound quality will suffer. The present invention speeds up the retrieval process by eliminating the need for repeated fetching of page address translation entries from the Main Memory.

By way of background, if the blocks of sample data were guaranteed to be in physically contiguous pages of Main Memory, then no multiple address translations would be necessary for the blocks of the sample data because it could be assumed that once the end of a page of sample data was reached, sound generation processing could continue with the next page of sample data at the next physical memory address. However, it is difficult to allocate large amounts of physically contiguous memory when using operating systems such as WINDOWS and WINDOWS 95. To allocate a large amount of physically contiguous memory as would be needed for the sample data would require allocation of a large, fixed amount of memory at computer system initialization time. This would cause the memory used for storage of sample data to be unavailable for use by other application programs at other times. The present invention avoids this disadvantage of fixed memory allocation by improving the way the Audio Processing Unit (or any other peripheral processing unit) accesses virtual memory in the system.

When processing sample data, the Audio Processing Unit accesses Main Memory in a fixed pattern, rather than a random fashion. The fixed pattern arises from the use of two distinct categories of sample data usage.

Figure 3A:
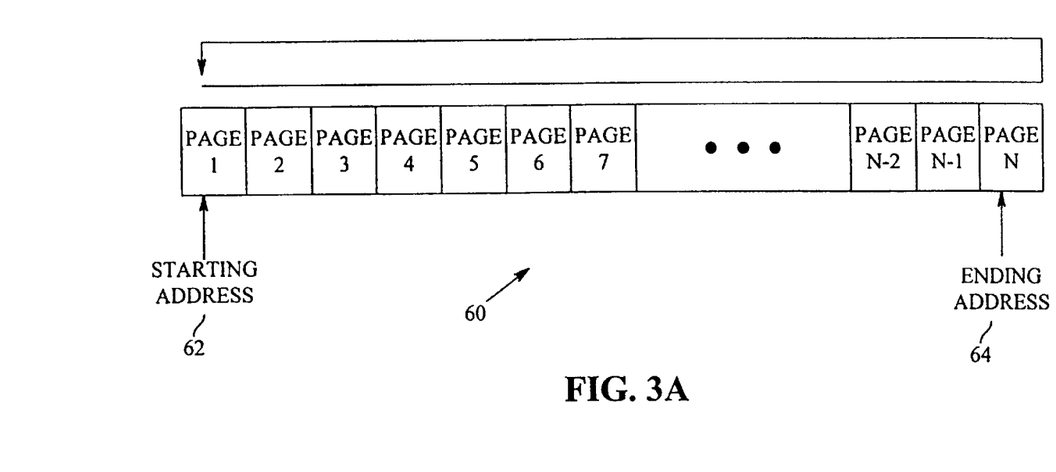
FIG. 3A is a diagram of a single use audio buffer.

The first category is known as a single use audio buffer. FIG. 3A is a diagram of a single use audio buffer. For Single Use Audio Buffer 60, the Audio Processing Unit commences processing of the data at the Starting Address 62 of the buffer and processes one or more pages of sample data until the Ending Address 64 is reached. Each page of memory storing sample data is individually fetched from Main Memory during processing. Note that the pages within Single Use Audio Buffer 60 are contiguous in virtual memory as shown in FIG. 3A, but are not contiguous in physical memory. Processing of the Single Use Audio Buffer may be restarted (i.e., to play a sound represented therein again) back at the Starting Address. Hence, the pages of sample data are always accessed in a sequential manner from the start of the sample to the end.

Figure 3B:
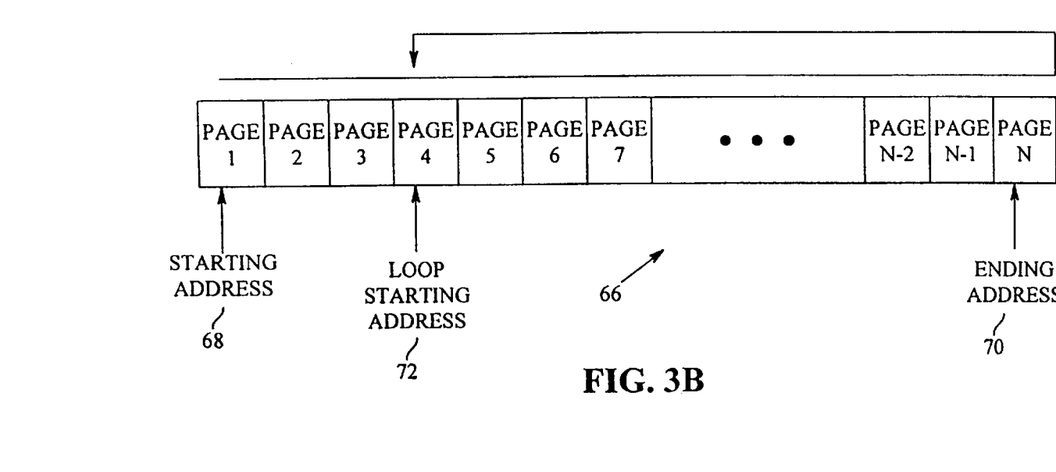
FIG. 3B is a diagram of a wave table audio buffer.

The second category is known as a wave table audio buffer. FIG. 3B is a diagram of a wave table audio buffer. For Wave Table Audio Buffer 66, the Audio Processing Unit commences processing of the data at the Starting Address 68 and processes one or more pages of sample data until the Ending Address 70 is reached. Each page of memory storing sample data is individually fetched from Main Memory during processing. The pages within the Wave Table Audio Buffer are also contiguous in virtual memory, but not in physical memory. Processing of the Wave Table Audio Buffer may be restarted at any designated point within the Wave Table Audio Buffer identified by Loop Starting Address 72 (an example of which is shown in FIG. 3B). The data within the loop may be processed a selected number of times. This second category of usage could also be expanded to support any number of loop starting addresses within the Wave Table Audio Buffer. Hence, multiple loops through selected portions of the sample data are possible.

When fetching pages during sample data processing, the present invention uses page address translation entry information embedded in each page, instead of retrieving page address translation entries from a central mapping table stored in the Main Memory. When a page of sample data is being processed, it is processed until the last two bytes of the page are encountered. The page address translation entry for the next page in the sample data stream is found in these last two bytes rather than sample data. The Audio Processing Unit performs the address translation function to determine the physical address of next page based on the embedded page address translation entry. In effect, the last two bytes of a page work as a pointer to the next page in the data stream being processed.

The present invention provides support for sequentially accessing physically non-contiguous audio and wave table data stored in buffers in a main memory of a PC by improving and optimizing the dynamic address translation function. Two characteristics of these main memory buffers enable increased performance based on the foregoing description of the preferred embodiment of the present invention. The first characteristic is that the buffers contain multimedia streaming data and are always accessed sequentially. When the audio processor reads the data buffer, it will always read from the first data element and continue until it reaches the end of the data buffer or until the program being executed by the CPU terminates processing of the data stream. The only exception to this sequential access of data is the loop segment. This second characteristic is inherent in data buffers containing audio instrument samples (called wave table samples). In these data buffers, at least one loop segment is included. A loop segment is a region in the data buffer where processing of the data transfers from the end of the loop segment back to the beginning of the loop segment.

As discussed above, page address translation entries are embedded into the data buffer itself. In this way, the page address translation entry for the next page is automatically read in by the Audio Processing Unit when the last bytes of the current page are received. With these characteristics of the data buffers, two major advantages are gained with the present invention.

The first advantage is that storage in the Audio Processing Unit for page address translation entries is dramatically reduced to a minimal set of two page address translation entries (one standard page address translation entry and one additional entry per looping segment for each data stream). For example, in the preferred embodiment, 32 data streams with one looping segment each are supported. Hence, total storage required for page translation entries is only 64 entries. This is in stark contrast to prior systems. For example, in a system having 4 Mega Bytes (MB) of main memory reserved for data streams, the dynamic address translator would normally require approximately 1,000 page address translation entries. This storage is expensive to implement local to a peripheral processor.

The second advantage is that because the page address translation entries are embedded in the data stream, there is no need to incur additional bus read cycles to separately read in a page address translation entry for each page over the bus from the main memory. The interleaving of the page address translation entries provides the next page address translation entry just before it is required. Since there are no separate bus read cycles expended to get this data, there is no time delay or increased latency associated with trying to fetch the next page address translation entries.

Figure 4A:
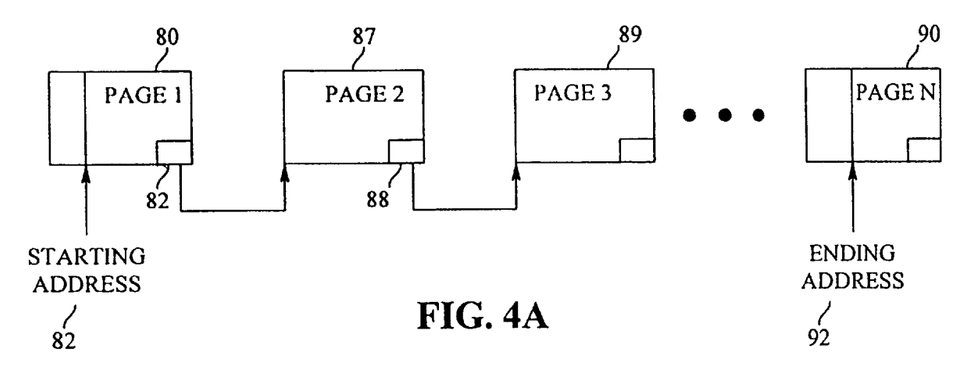
FIG. 4A is a diagram illustrating the use of embedded page address translation entries for a single use audio buffer according to the present invention.
Figure 4B:
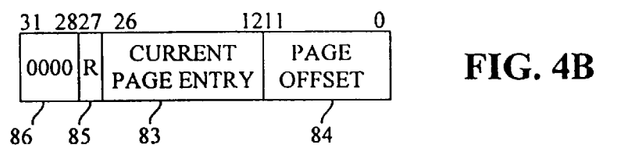
FIG. 4B is a diagram of the format of an address for a system memory location according to the present invention.

FIG. 4A is a diagram illustrating the use of embedded page address translation entries for a single use audio buffer according to the present invention. By using the embedded page address translation entries as pointers, a linked list of pages for the current sample data is created. Each page may be stored at any location in physical memory. Page 1 80 is the starting page for an audio buffer. It is referenced by Starting Address 82. The Starting Address is comprised of a starting page and a starting page offset within the starting page. FIG. 4B is a diagram of the format of an address for a system memory location according to the present invention. The starting page is stored in the Current Page Entry field 83 and the starting page offset is stored in the Page Offset field 84. The R field 85 indicates whether the digital audio sample data is stored in system RAM or Read-Only Memory (ROM). Bits 27–31 of the address are set to zero. The Starting Address is stored in the sample header data for the selected sample. Also stored in the sample header data is the length of the sample. Audio Processing Unit uses the length to determine when all data in the audio buffer have been processed. Another variable used to manage the processing of the audio buffer is the current page address. The current page address is a pointer in physical memory to the page currently being processed in the audio buffer. At the end of Page 1 80 is embedded a Page Address Translation Entry 1 82, which, when translated, becomes the starting address of the next page in the audio buffer. This next page is shown as Page 2 87 in FIG. 4A. Similarly, at the end of Page 2 87 is embedded a Page Address Translation Entry 2 88. This entry points to Page 3 89, and so on, until a last page, Page N 90 is reached. Ending Address 92 points to the last byte of the audio buffer in Page N 90.

By embedding the page address translation entries in the pages, the number of read requests over the Bus are substantially reduced. Since two eight-bit bytes are used to store each entry, a 256 MB memory limit is supported. The present invention allows for the dynamic allocation and deallocation of digital audio sample data buffers with no size limitation on the buffer. Furthermore, although the page address translation entries are stored in the last two bytes of the pages, other locations within the pages (such as the first two bytes) may also be used.

Figure 4C:
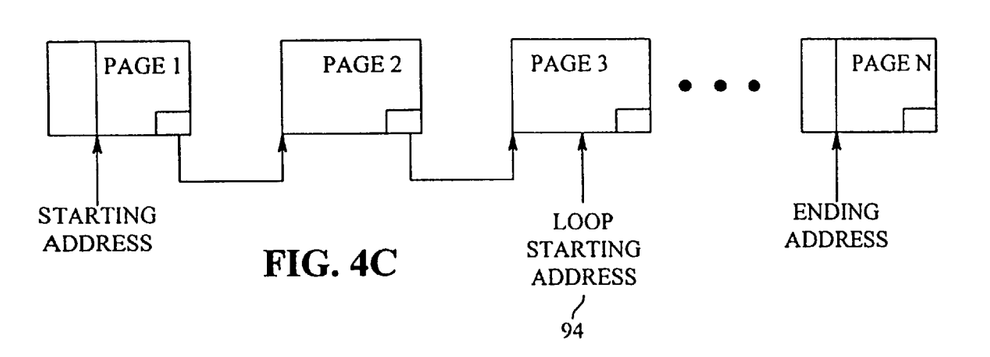
FIG. 4C is a diagram illustrating the use of embedded page address translation entries for a wave table audio buffer according to the present invention.

A wave table audio buffer can be handled in a similar manner. FIG. 4C is a diagram illustrating the use of embedded page address translation entries for a wave table audio buffer according to the present invention. For wave table audio buffers, a Loop Starting Address 94 is computed from a loop starting page and a loop starting page offset within the loop starting page. A loop length is used to calculate when the end of the loop has been reached. These variables are stored in the header sample data for a wave table audio buffer.

Figure 5:
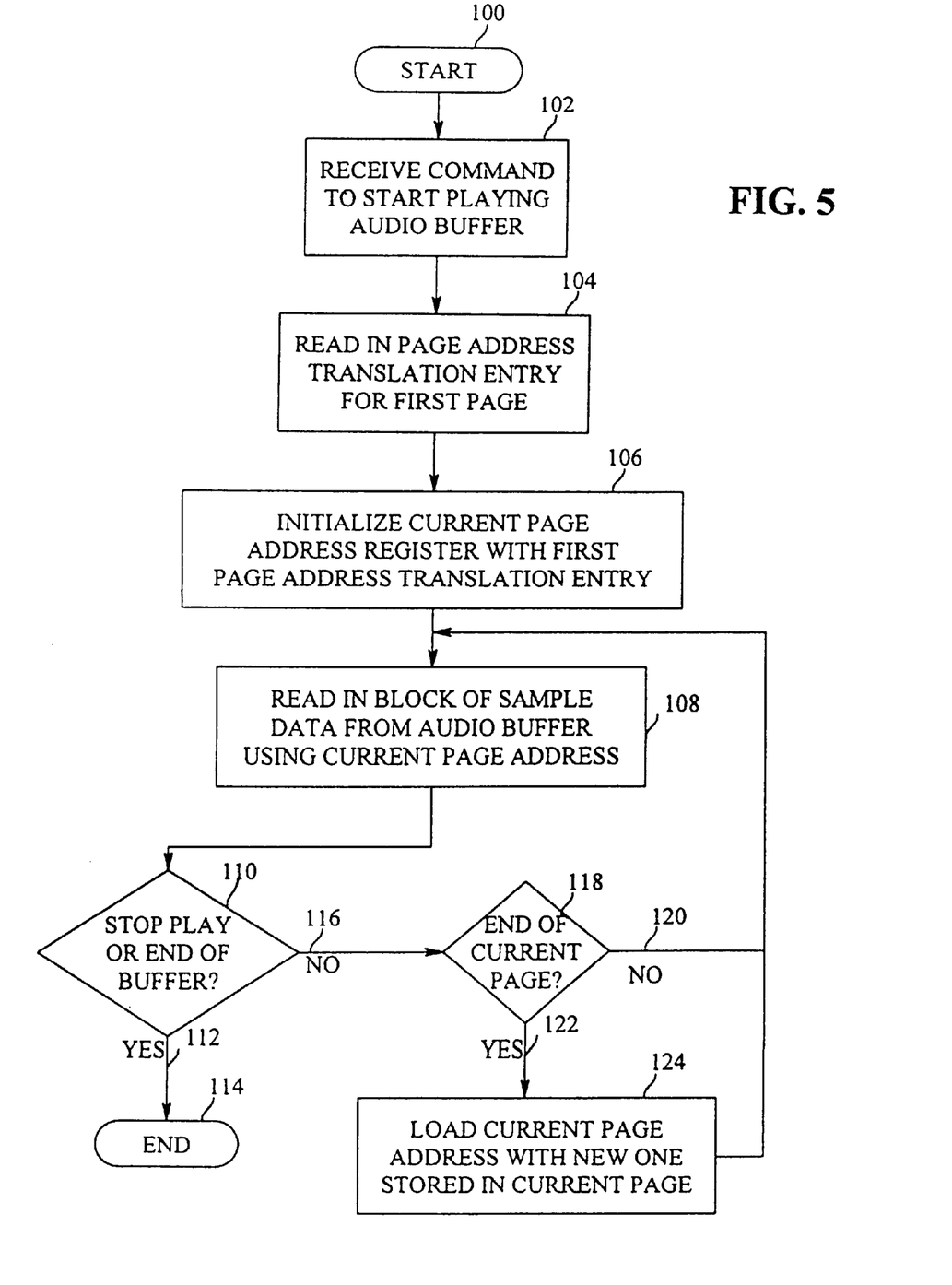
FIG. 5 is a flow chart of the steps for reading a single use audio buffer.

FIG. 5 is a flow chart of the steps for reading a single use audio buffer. These steps are performed by the Audio Processing Unit. This process uses a Current Page Address Register as a temporary variable. After Start Step 100, the Audio Processing Unit receives a command from the CPU to start playing a single use audio buffer at Step 102. Next, at Step 104 the page address translation entry for the first page of the single use audio buffer is read from the sample header data in the Main Memory. At Step 106, the Current Page Address Register is initialized to the first page address translation entry. At Step 108, a block of sample data is read from the single use audio buffer in the Main Memory by the Audio Processing Unit using the Current Page Address. This block of sample data is processed by the Audio Processing Unit and the Loudspeaker to produce a sound. If at Test Step 110 the Audio Processing Unit receives a command to stop playing the sample data or the end of the audio buffer has been reached, then Yes path 112 is taken and processing ends at End Step 114. Otherwise, processing of the audio buffer continues via No path 116 to Test Step 118.

At Test Step 118 a check is made to determine if the end of the current page has been reached. If not, then more blocks of data on the current page must be processed, so No path 120 is taken back to Step 108 to read in the next block. If the end of the current page has been reached, Yes path 122 is taken to Step 124. At this step, the Current Page Address Register is loaded with the new page address translation entry contained in the last two bytes of the current page, thereby following the link from the current page to the next page of sample data in the audio buffer. Processing continues for this next page of sample data (which is now the current page) on Step 108, where a block of data from the audio buffer to be processed is read in from Main Memory. One skilled in the art can see that with the present invention the number of bus accesses is at least the number of pages plus one, rather than two times the number of pages.

Figure 6:
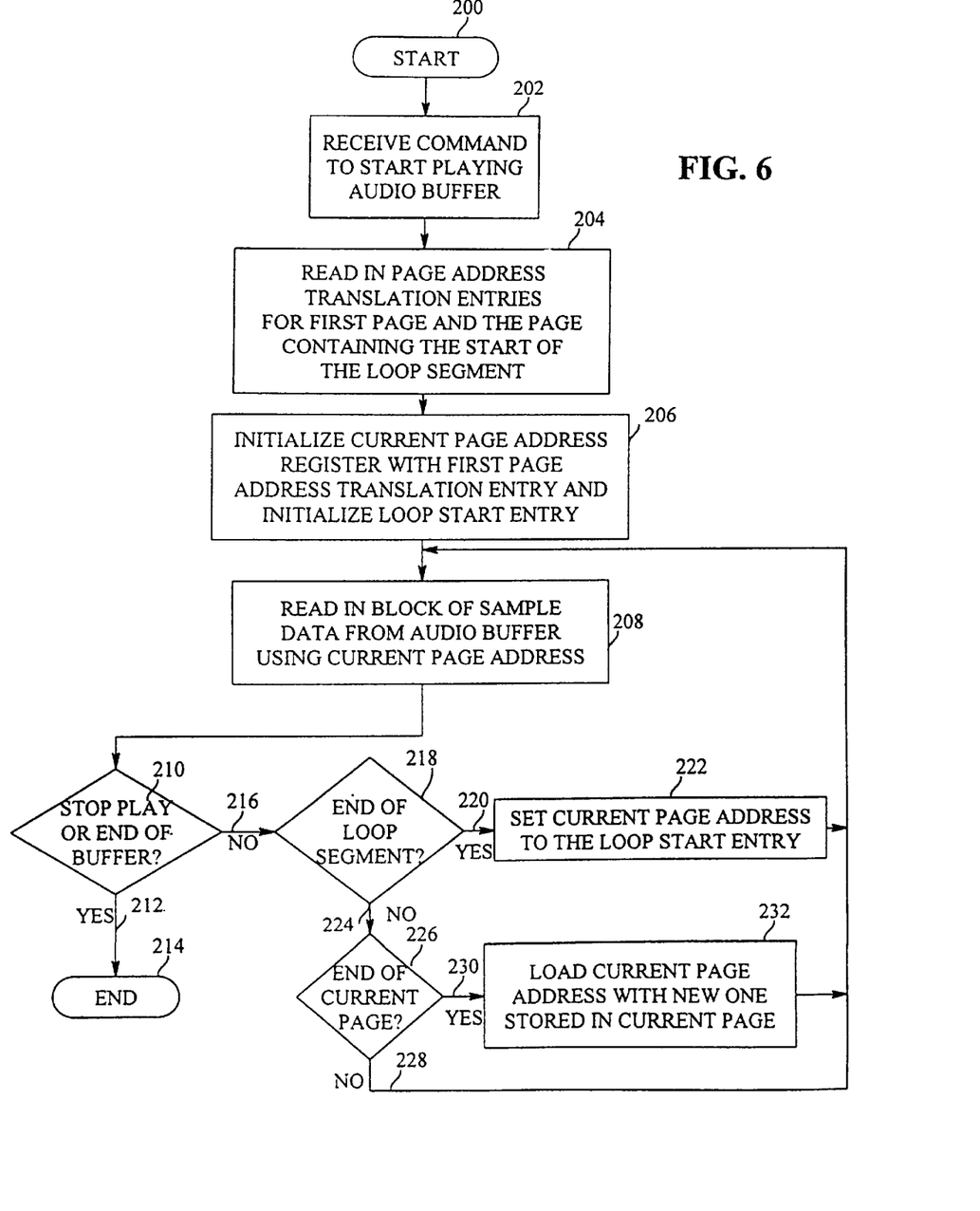
FIG. 6 is a flow chart of the steps for reading a wave table audio buffer.

The process for handling wave table audio buffers is similar to that for handling single use audio buffers, with the addition of steps to handle the looping within the buffer. FIG. 6 is a flow chart of the steps for reading a wave table audio buffer. These steps are performed by the Audio Processing Unit. This process uses a Current Page Address Register and a Loop Start Entry as temporary variables. After Start Step 200, the Audio Processing Unit receives a command from the CPU to start playing a wave table audio buffer at Step 202. Next, at Step 204 the page address translation entries for the first page and the page containing the start of the loop segment of the wave table audio buffer are read from the sample header data in the Main Memory. At Step 206, the Current Page Address Register is initialized to the first page address translation entry and the Loop Start Entry is initialized to the page address translation entry of the starting address of the loop segment. At Step 208, a block of sample data is read from the wave table audio buffer in the Main Memory by the Audio Processing Unit using the Current Page Address Register. This block of sample data is processed by the Audio Processing Unit and the Loudspeaker to produce a sound. If at Test Step 210 the Audio Processing Unit receives a command to stop playing the sample data or the end of the audio buffer has been reached, then Yes path 212 is taken and processing ends at End Step 214. Otherwise, processing of the audio buffer continues via No path 216 to Test Step 218.

At Test Step 218, a check is made to determine if the end of a loop segment has been reached. If the end of the loop segment has been reached, Yes path 220 is taken to Step 22. At this step, the Current Page Address Register is set to the Loop Start Entry value, thereby resetting the current page back to the start of the looping sample data. Processing then continues with a block of data being fetched at Step 208. Otherwise No path 224 is taken and processing continues at Test Step 226.

At Test Step 226 a check is made to determine if the end of the current page has been reached. If not, then more blocks of data on the current page must be processed, so No path 228 is taken back to Step 208 to read in the next block. If the end of the current page has been reached, Yes path 230 is taken to Step 232. At this step, the Current Page Address Register is loaded with the new page address translation entry contained in the last two bytes of the current page, thereby following the link from the current page to the next page of sample data in the audio buffer. Processing continues for this next page of sample data (which is now the current page) on Step 208, where a block of data from the audio buffer to be processed is read in from Main Memory. The number of bus accesses for this case at least the number of pages plus two, rather than at least two times the number of pages being processed in the audio buffer.

Figure 7:
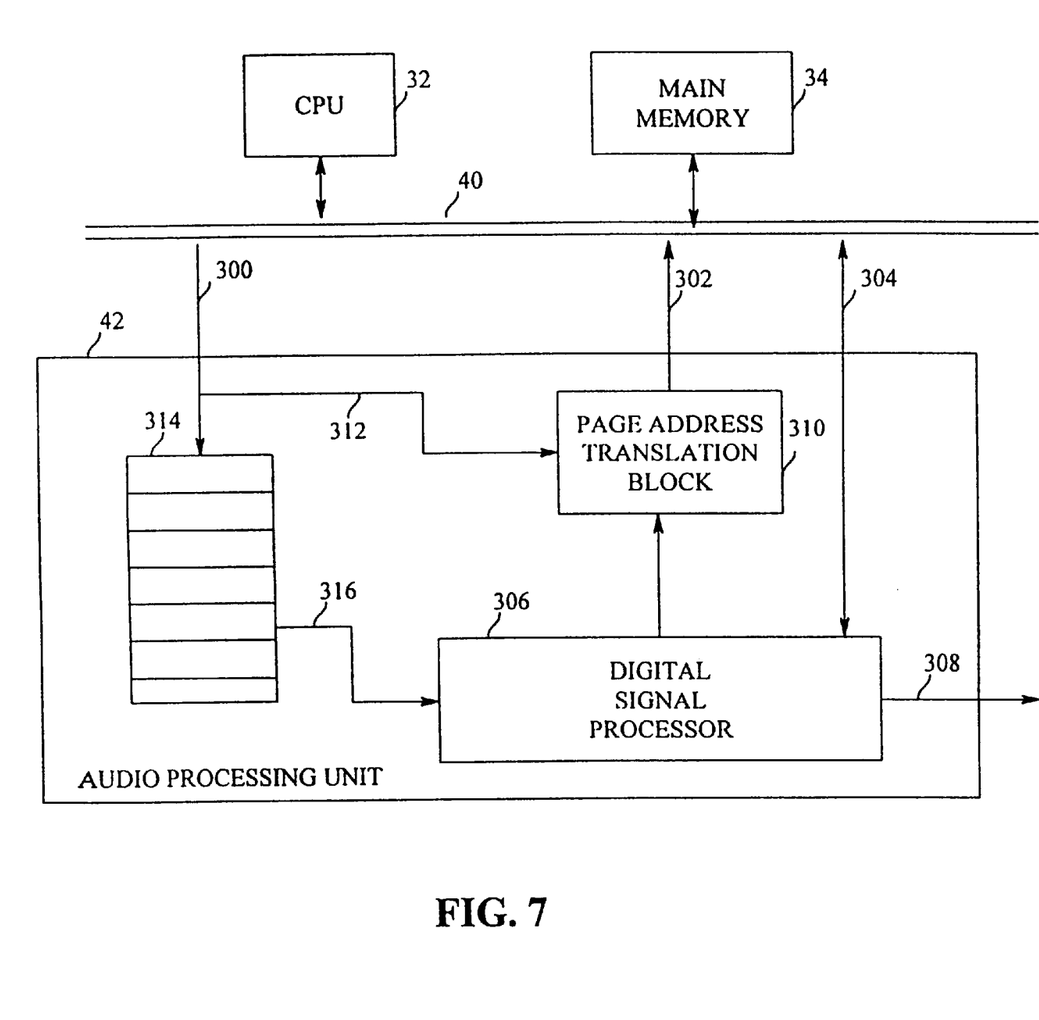
FIG. 7 is a diagram illustrating the main components of the Audio Processing Unit relevant to the present invention.

FIG. 7 is a diagram illustrating the main components of the Audio Processing Unit relevant to the present invention. The Audio Processing Unit is commercially embodied as the SONIC VIBES audio accelerator product available from the assignee of the present invention. The Audio Processing Unit may exist as an integrated circuit chip, as circuitry on a printed circuit board, or as any other suitable hardware implementation. The Audio Processing Unit 42 is coupled to the Bus 40 by Data line 300, Address line 302, and Command line 304. Also coupled to the Bus 40 are CPU 32 and Main Memory 34. Main Memory is used to store all programs and data in the system. The Audio Processing Unit includes a Digital Signal Processor (DSP) 306 which drives an Output line 308 connected to a loudspeaker (not shown). The DSP is a programmable processor that consumes sample data and generates output audio signals. When the Audio Processing Unit is to generate a signal to produce a sound, the CPU sends a command over the Bus 40 and Command line 304 to the DSP 306. The DSP directs a Page Address Translation Block 310 to send the physical address of the first page address translation entry to Main Memory 34. The Page Address Translation Block is a hardware module for translating the virtual page addresses to physical page addresses used to access audio sample data stored in Main Memory. The entry is returned from the sample header data over the Bus and Data line 300 to Page Address Translation Block 310 via New Page Address line 312. The Page Address Translation Block translates the received page address translation entry into a physical address in Main Memory for a page of data in an audio buffer. The physical address is sent over the Bus to Main Memory and the selected page of the audio sample data buffer is sent over Data line 300 and stored in FIFO Buffer 314. FIFO Buffer 314 stores all incoming audio sample data read from the Main Memory and moving across the Bus. When needed, the audio sample data is read out of the FIFO Buffer over Line 316 to DSP 306 for processing.

Figure 8:
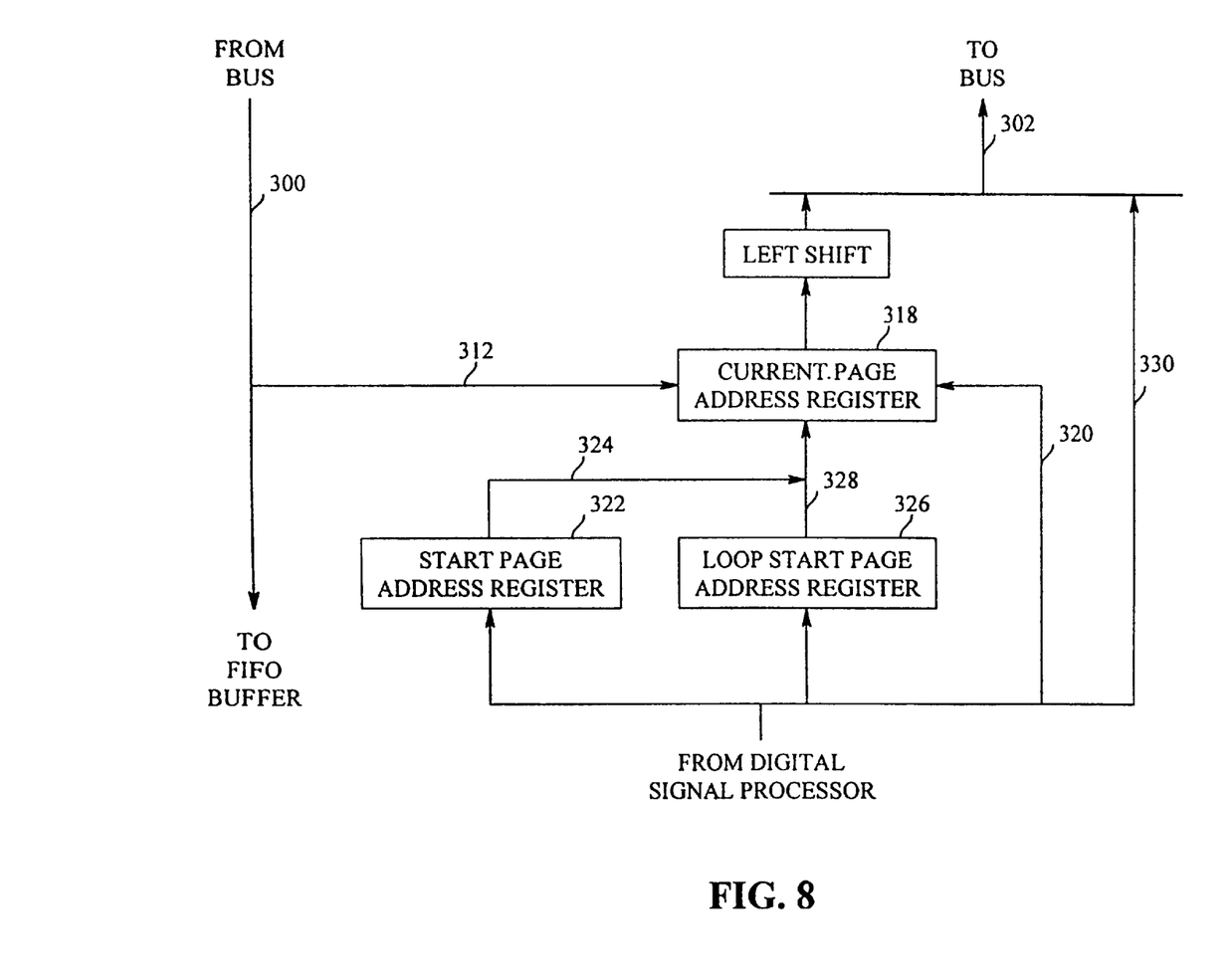
FIG. 8 is a diagram of the Page Address Translation Block according to the present invention.

FIG. 8 is a diagram of the Page Address Translation Block according to the present invention. Current Page Address Register 318 holds the page address of the current page. It is reloaded with a new page address from the Bus 40 when a Load Request signal is received from the DSP 306 on Line 320. The Current Page Address Register may be loaded from the Start Page Address Register 322 over Line 324. The Start Page Address register holds the starting page address obtained from the sample header data. The Current Page Address Register may also be loaded from the Loop Start Page Address Register 326 over Line 328. The Loop Start Page Address Register holds the starting page address of a page where a loop segment begins. This information is also obtained from the sample header data. A page address in the Current Page Address Register is shifted to the left and combined with the current offset within the page arriving from the DSP on Line 330 to form a physical address for a location in Main Memory. This physical address is then sent over Line 302 to Main Memory to fetch the page resident at the specified location.

The present invention is focused on supporting processing of digital audio sample data by an audio accelerator product. However, the principles detailed herein are equally applicable to graphics accelerators and other peripheral devices connected to a bus for accessing main memory.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. A method of embedding page address translation entries within a sequentially accessed data buffer comprising the steps of:

storing the data buffer in at least a first page of memory, a second page of memory, and a third page of memory, the first, second and third page of memory being contiguous in virtual memory but non-contiguous in physical memory;

storing a first page address translation entry for a virtual address of the second page of memory in the first page of memory;

storing a second page address translation entry for a virtual address of a third page of memory in the second page of memory;

storing a third page address translation entry for the virtual address of the second page of memory in the third page of memory;

reading the first, second and third pages of memory;

extracting the first page address translation entry from the first page of memory;

translating the virtual address of the second page of memory into a physical address of the second page of memory using the first page address translation entry;

extracting the second page address translation entry from the second page of memory;

translating the virtual address of the third page of memory into the physical address for the second page of memory using the second page address translation entry;

extracting the third page address translation entry from the third page of memory; and translating the virtual address of the second page of memory into the physical address for the second page of memory using the third page address translation entry.

2. A method of accessing by a peripheral processor of a data buffer stored in a main memory, the peripheral processor coupled to the main memory by a bus, the data buffer being stored in a plurality of pages of memory which are contiguous in virtual memory but non-contiguous in physical memory, the method comprising the steps of:

reading a first page address translation entry for a first virtual address of a starting location of a first page of the data buffer from a location in the main memory;

translating the first virtual address into a first physical address using the first page address translation entry;

reading the first page in main memory addressed by the first physical address;

extracting a second page address translation entry for a second virtual address of a starting location of a second page of the data buffer from within the first page;

translating the second virtual address into a second physical address using the second page address translation entry;

reading a second page of the data buffer addressed by the second physical address;

extracting a third page address translation entry for a third virtual address of a starting location of a third page of the data buffer from within the second page;

translating the third virtual address into a third physical address using the third page address translation entry;

reading a third page of the data buffer addressed by the third physical address; and extracting the second page address translation entry for the second virtual address of the starting location of the second page of the data buffer from within the third page.

3. A method of sequentially accessing by an audio processing unit of a digital audio sample data buffer stored in a main memory, the audio processing unit coupled to the main memory by a bus, the digital audio sample data buffer being stored in a plurality of pages of memory which are contiguous in virtual memory but at least partially non-contiguous in physical memory, the method comprising the steps of:

receiving a command to start playing a digital audio sample represented by the digital audio sample data buffer;

reading a first page address translation entry for a first virtual address of a starting location of a first page of the digital audio sample data buffer from a location in the main memory;

translating the first virtual address into a first physical address using the first page address translation entry;

reading the first page of the digital audio sample data buffer addressed by the first physical address;

processing the first page of the digital audio sample data buffer;

extracting from within the first page a second page address translation entry for a second virtual address of a starting location of a second page of the digital audio sample data buffer;

translating the second virtual address into a second physical address using the second page address translation entry;

reading the second page of the digital audio sample data buffer addressed by the second physical address; and processing the second page of the digital audio sample data buffer.

4. The method of claim 3, further comprising the steps of:

extracting from within the second page a third page address translation entry for a third virtual address of a starting location of a third page of the digital audio sample data buffer;

translating the third virtual address into a third physical address using the third page address translation entry;

reading the third page of the digital audio sample data buffer addressed by the third physical address; and processing the third page of the digital audio sample data buffer.

5. The method of claim 4 wherein each of the steps of processing of pages of the digital audio sample data buffer comprises the steps of generating analog electrical signals from the pages and sending the signals to a loudspeaker.

6. The method of claim 4 wherein each of the steps of reading pages comprises the step of transferring the pages from the main memory over the bus to the audio processing unit.

7. The method of claim 4, wherein the reading, translating, processing, and extracting steps are repeated a predetermined number of times.

8. The method of claim 4, wherein the reading, translating, processing, and extracting steps are repeated a predetermined number of times for a selected portion of the pages.

9. A system for embedding page address translation entries within a sequentially accessed data buffer comprising:

a memory;

means for storing the data buffer in at least a first page of memory, a second page of memory, and a third page of memory, the first, second and third pages of memory being contiguous in virtual memory but non-contiguous in physical memory; and means for storing a first page address translation entry for a virtual address of the second page of the memory in the first page of the memory;

means for reading the first, second, and third pages of the memory;

means for extracting the first page address translation entry from the first page of the memory;

means for translating the virtual address of the second page of the memory into a physical address of the second page of the memory using the first page address translation entry;

means for storing a second page address translation entry for a virtual address of a third page of the memory in the second page of the memory;

means for extracting the second page address translation entry from the second page of the memory;

means for translating the virtual address of the third page of the memory into a physical address for the third page of the memory using the second page address translation entry;

means for storing a third page address translation entry for a virtual address of the second page of the memory in the third page of the memory;

means for extracting the third page address translation entry from the third page of the memory; and means for translating the virtual address of the second page of the memory into the physical address of the second page of the memory using the third page address translation entry.

10. A system for accessing a digital audio sample data buffer stored in a main memory, the system coupled to the main memory by a bus, the digital audio sample data buffer being stored in a plurality of pages of memory which are contiguous in virtual memory but at least partially non-contiguous in physical memory, the system comprising:

means for reading a first page address translation entry for a first virtual address of a starting location of a first page of the digital audio sample data buffer from a location in the main memory;

means for translating the first virtual address into a first physical address using the first page address translation entry;

means for reading the first page of the digital audio sample data buffer addressed by the first physical address;

means for extracting a second page address translation entry for a second virtual address of a starting location of a second page of the digital audio sample data buffer from within the first page;

means for translating the second virtual address into a second physical address using the second page address translation entry; and means for reading a second page of the digital audio sample data buffer addressed by the second physical address.

11. The system of claim 10, further comprising:

means for extracting a third page address translation entry for a third virtual address of a starting location of a third page of the digital audio sample data buffer from within the second page;

means for translating the third virtual address into a third physical address using the third page address translation entry; and means for reading a third page of the digital audio sample data buffer addressed by the third physical address.

12. The system of claim 11, wherein the digital audio sample data buffer is a single use audio buffer.

13. The system of claim 11, wherein the digital audio sample data buffer is a wave table audio buffer.

14. An audio processing unit for processing a digital audio sample data buffer stored in a main memory to produce sounds by a loudspeaker, the main memory coupled to a PCI bus, the digital audio sample data being stored in a plurality of pages of the main memory which are contiguous in virtual memory but at least partially non-contiguous in physical memory, the audio processing unit comprising:

a first-in, first-out (FIFO) buffer for temporarily storing the pages;

signal processing means for receiving a command to start playing a digital audio sample represented by the digital audio sample data buffer, for processing pages of the digital audio sample data buffer received from the FIFO buffer, for generating analog electrical signals corresponding to the processed pages, and for sending the signals to the loudspeaker;

means for enabling reading of a first page address translation entry for a first virtual address of a starting location of a first page of the digital audio sample data buffer from a location in the main memory;

a page address translation block comprising means for translating the first virtual address into a first physical address using the first page address translation entry;

means for extracting from within the first page a second page address translation entry for a second virtual address of a starting location of a second page of the digital audio sample data buffer; and means for translating the second virtual address into a second physical address using the second page address translation entry;

means for reading the first page of the digital audio sample data buffer addressed by the first physical address and storing the first page in the FIFO buffer; and means for reading the second page of the digital audio sample data buffer addressed by the second physical address and storing the second page in the FIFO buffer.

* * * * *